2,780,834

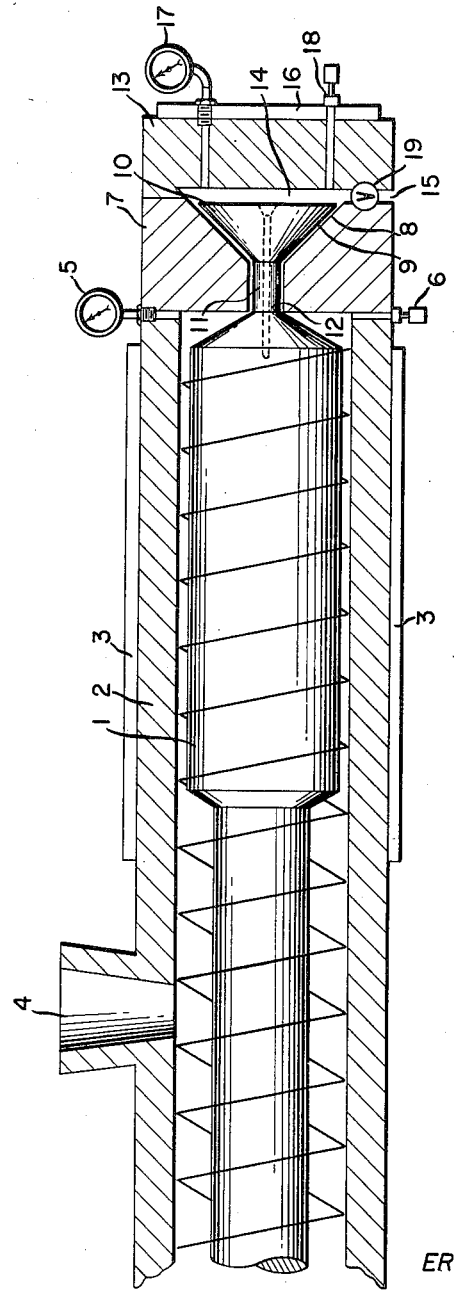

EXTRUDER EQUIPPED WITH A MULLING HEAD

Ernest Carl Bernhardt, Wilmington, Del., assignor to E. I. du Pont de Nemours and Company, Wilmington, Del., a corporation of Delaware Application October 6, 1955, Serial No. 538,862

1 Claim. (Cl. 18—12)

This invention relates to an extruder-mulling device which is useful in extruding and compounding plastic materials.

For many practical applications, it is desirable to subject plastic materials, emulsions, plasticizers, etc., in combination with colorants, pigments or the like, to a mulling action thus generating high shear stresses. For example, in the compounding of thermoplastic materials with various fillers, pigments, plasticizers, carbon black, dyestuffs, etc., and in the manufacture of dispersions, a mulling or grinding action, somewhat analogous to that of a mortar and pestle, or a ball or rod mill, is very helpful. Accordingly, various forms of grinding and mulling machinery, Banbury mills and mill rolls, have been devised in the past. However, none of these prior art devices combine the features of (1) continuous operation, (2) totally enclosed atmosphere (to prevent excessive oxidation), and (3) wide range of adjustment or grinding forces. An object of this invention is to provide an extruder-muller which combines these three advantageous features.

A schematic diagram of the extruder-muller of this invention is shown in the drawing. The device, as illustrated, comprises an extruder screw 1 rotating without conventional thrust bearings in an extruder barrel 2, equipped with suitable heaters 3, and means 4 for feeding polymeric material (or other material to be mulled). A pressure guage 5, and a thermocouple 6 for temperature measurements on the material being processed, are suitably installed at a forward point along the barrel near the nose of the extrusion screw. The screw 1 should preferably be of the metering type with an unusually shallow flight to generate very high pressures. The length of the screw and the magnitude of the helix angle should be such as to produce melting of the plastic material within the channel (in cases where the material is fed as a solid). The material passing forward from the screw must pass between a mulling head housing 7 having a conical internal surface 8 and a correspondingly shaped surface 9 of a detachable nose-piece 10 which turns with the extruder screw. The apex of each of the conical surfaces faces rearward. These surfaces may be scored or serrated if desired. The housing 7 and the nose-piece 10 may have a shaft portion 11 immediately rearward of the conical surfaces if desired, wherein a shaft 12 rotates with the screw and communicates the motion of the screw to the conical portion of the nose-piece. The rearward thrust which is generated by the action of the extruder screw is absorbed in the mulling head, and in particular is applied to the polymeric or other material as it is forced between the conical surface of the housing 7 and the conical surface 8 of the nose-piece 9. All of this thrust sets to press these two mulling surfaces together and this results in smearing the material passing through the machine between the conical surfaces into a very thin layer, thus causing it to be milled and homogenized. The mulling head housing includes a die member 13 which encloses a zone 14 occupied by the mulled material prior to release through the die 15. This die member 13 may be equipped with a suitable heater 16, pressure gauge 17, thermocouple 18 and die valve 19 to regulate the back pressure and thrust exerted against the mulling surfaces.

The principal advantages and operating features of the device just described are as follows:

(a) It is a mulling device which operates without a fixed clearance, hence is to a considerable extent self-adjusting in that the clearance varies with the stock being mulled, and according to the settings of the die valve.

(b) It provides a continuous operation.

(c) The machine is simple to take apart and clean.

(d) The material, while it is (or may be) at elevated temperature, e. g. in the enclosed zone 14, is free of air during normal operation, hence air-sensitive materials can be handled.

(e) Pastes, liquids, and thermoplastics can be handled.

(f) The pressure on the mulling surfaces can be controlled by controlling screw speed, temperature of the stock, position of the valve. Mulling heads of different configuration and sizes (relative to the cross section area of the screw) may be used.

It is to be understood, of course, that the shape of the die can be varied, as desired, to produce rod, tube, film, etc. Moreover, the stock can be run through the machine a plurality of times, or a plurality of machines can be used in sequence, if desired. The extruded material, in any form, can, in certain applications be stretched or oriented, and indeed this can result in orientation of ingredients which have been added to plastic materials to form the stock to be extruded.

The machine has specific utility in the preparation of color concentrates in nylon resins, and it is also useful in the preparation of pigment dispersions in inks, and in mixing colors with thermoplastic materials generally.

I claim:

An extruding and mulling device comprising an extruder screw adapted to rotate without any thrust bearing in an extruder barrel, a means for feeding extrudable material into a channel between the extruder screw and the extruder barrel, said channel communicating with a zone, forward from the extrusion screw, enclosed by a housing and a die member, said housing being stationary and having a truncated conical internal surface concentric with the axis of the extruder screw, said conical surface being parallel with, and adapted to cooperate with, a similarly shaped conical exterior surface of a nose-piece which rotates with, and is detachably associated with, the extruder screw, the said conical surfaces having their apexes facing rearward, said die member containing a die communicating with said enclosed zone, said die being so adapted that the extruded material can be emitted therefrom after passage from the said channel through a clearance between the said conical surfaces and into the said enclosed zone, said die being equipped with a die valve, the rearward thrust generated by the action of the extrusion screw being entirely absorbed by a mulling effect of the said conical surfaces on the extrudable material as it passes between said surfaces.

References Cited in the file of this patent

UNITED STATES PATENTS 2,469,999   Stober _____ May 10, 1949